United States Patent
Stefani et al.

(10) Patent No.: US 11,797,535 B1
(45) Date of Patent: Oct. 24, 2023

(54) USE OF BATCH MODE FUNCTION EXECUTION IN DATABASE ENGINES TO ENABLE EFFICIENT CALLS TO REMOTE SERVICES

(71) Applicant: Amazon Technologies, Inc., Seattle, WA (US)

(72) Inventors: Stefano Stefani, Issaquah, WA (US); Sudipta Sengupta, Sammamish, WA (US); Julio Delgado Mangas, Redmond, WA (US); James Laurence Finnerty, Concord, MA (US); Ronak Bharat Shah, Redmond, WA (US); Sumeetkumar V. Maru, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 17/105,092

(22) Filed: Nov. 25, 2020

Related U.S. Application Data

(60) Provisional application No. 62/941,564, filed on Nov. 27, 2019.

(51) Int. Cl.
| | |
|---|---|
| *G06F 16/00* | (2019.01) |
| *G06F 16/2453* | (2019.01) |
| *G06N 20/00* | (2019.01) |
| *G06F 16/2455* | (2019.01) |
| *G06F 16/248* | (2019.01) |

(52) U.S. Cl.
CPC ...... *G06F 16/24542* (2019.01); *G06F 16/248* (2019.01); *G06F 16/24552* (2019.01); *G06F 16/24553* (2019.01); *G06N 20/00* (2019.01)

(58) Field of Classification Search
CPC ......... G06F 16/24542; G06F 16/24552; G06F 16/24553; G06F 16/248; G06N 20/00
USPC ............................................ 707/600–899
See application file for complete search history.

(56) References Cited

U.S. PATENT DOCUMENTS

| | | | |
|---|---|---|---|
| 2015/0379424 A1* | 12/2015 | Dirac ..................... | G06N 20/00 706/12 |
| 2020/0004596 A1* | 1/2020 | Sengupta ................ | G06N 5/04 |
| 2020/0065303 A1* | 2/2020 | Bhattacharjee ....... | G06F 16/278 |

* cited by examiner

*Primary Examiner* — Irete F Ehichioya
*Assistant Examiner* — Shirley D Hicks
(74) *Attorney, Agent, or Firm* — Nicholson De Vos Webster & Elliott LLP

(57) ABSTRACT

Techniques for batch mode execution for calls to remote services are described. A method of batch mode execution for calls to remote services may include generating, by a query service of a provider network, a query plan to optimize a query for batch processing of data, the query plan including at least a function reference to a function provided by at least one service of the provider network, executing the query plan to invoke the function associated with the function reference, wherein a batch function generates a request including a batch of service calls to be processed by the at least one service, sends the request including the batch of service calls to the at least one service, and obtains a plurality of machine learning responses from the at least one service, and generating a query response based on the plurality of responses.

20 Claims, 9 Drawing Sheets

USE OF BATCH MODE FUNCTION EXECUTION IN DATABASE ENGINES TO ENABLE EFFICIENT CALLS TO REMOTE SERVICES

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with. While machine learning techniques provide many benefits to organizations, use of such machine learning techniques requires significant specialized knowledge that is not easy to use with traditional data processing using relational databases and other data stores.

BRIEF DESCRIPTION OF DRAWINGS

Various embodiments in accordance with the present disclosure will be described with reference to the drawings, in which.

DETAILED DESCRIPTION

Figure 1:
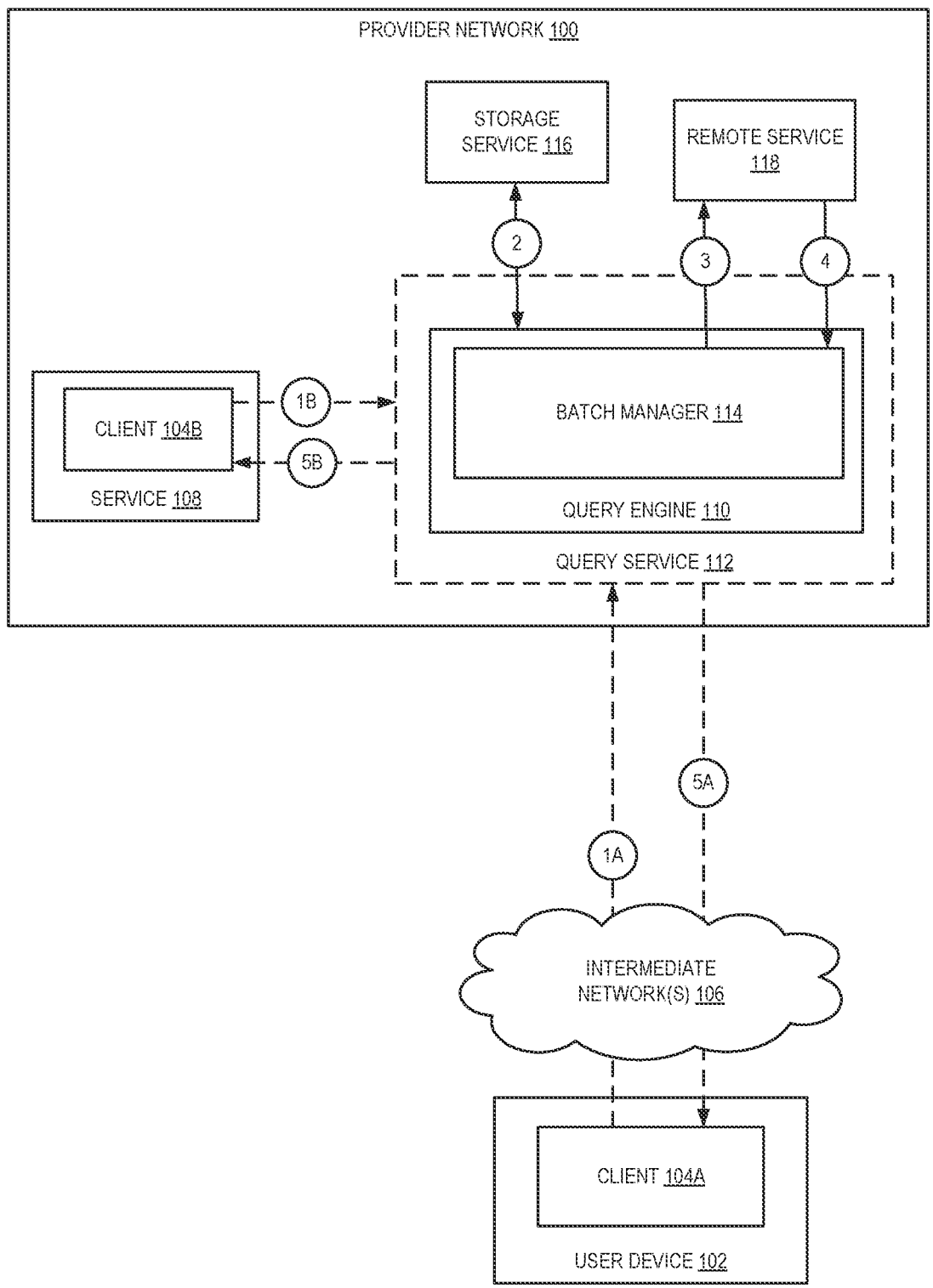
FIG. 1 is a diagram illustrating an environment for batch mode execution for calls to remote services according to some embodiments.

The present disclosure relates to methods, apparatus, systems, and non-transitory computer-readable storage media for batch mode execution for calls to remote services. Database engines traditionally work one row at a time. When user defined or built in functions are called, functions receive one row and are expected to return one value. The exception are window functions which receive a current row and access to rows before and after the current row but are still expected to return a single value. According to some embodiments, a query engine of a query service may include a batch manager to perform calls to remote services, such as to perform machine learning inference, on remote servers, or other functions provided by services that are external to a query service. A batch manager receives N rows as input and returns N values. For functions calling remote services, batching multiple rows into a single request has a dramatic impact in performance (e.g., more than 100× throughput), by amortizing the network connection costs across the N rows in the batch. Additionally, some remote services, such as machine learning services are computationally more efficient when processing several datapoints at a time.

In some embodiments, a batch manager can be implemented using one or more batch iterators. The batch iterator may be a volcano style iterator that has been extended to provide batching functionality. Traditional, row-at-a-time volcano iterators are connected in a way that pulling one result on one iterator (e.g., calling the next( ) function on the iterator) will cause it to pull one result from its sources (e.g., call each sources' respective next( ) function) and so on. For batch iterators, this functionality has been extended such that the first time next( ) is called on a batch iterator it will call next( ) N times on each of its sources. The batch iterator can then perform a call to an remote service for the N rows that are returned by the sources, and cache the N results, and return only one result in response to the first next( ) that was called on the batch iterator. When the batch iterator receives subsequent calls to next result in the operator returning one of the cached results, until the cache is empty, at which point the operator calls N time its sources, and so on.

In some embodiments, a batch manager may be enabled using batch operators. A batch operator may be added to a query plan that is generated for a query received by the query service. The batch operator can gather rows to generate a batch and can invoke one or more batch functions which invoke remote services to process the rows in the batch. The batch operator can obtain the results from each of the batch function and these results can then be used to generate the response to the query received by the query service.

By enabling batch processing of service calls to remote services, processing intensive tasks, such as machine learning inference, can be offloaded to services which can scale independently of the query service. This enables the query service and storage service to be hosted using commodity hardware while greatly improving query processing performance.

FIG. 1 is a diagram illustrating an environment for batch mode execution for calls to remote services according to some embodiments. As shown in FIG. 1, a provider network 100 can include a query service 112. A user may have data which is stored in data stores of a storage service 116. In various embodiments, storage service 116 may include one or more of an object storage service, a relational database service, a data warehouse service, or other storage service. The data may be added to the storage service by the user, from user device 102 or may be added from services of provider network 100 or other services external to provider network 100. This data may be analyzed to obtain useful information for the user. A part of this analysis may include using analysis of all or portions of the data by remote services 118. However, some remote services may require specialized knowledge and may not be well integrated into data management services, such as query service 112. Embodiments address these issues by providing techniques for making calls to remote services from queries.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a request can be sent to a query service 112 to perform a query on data stored in a storage service 116. In some embodiments, the request can originate from a user device 102, as shown at numeral 1A, or from a service 108 (e.g., a serverless function or other service) of provider network 100, as shown at numeral 1B. In various embodiments, a "serverless" function may include code provided by a user or other entity—such as the provider network itself—that can be executed on demand. The request may originate from a client 104A executing on user device 102, or a client 104B of service 108, which may interface with the query service 112 through one or more interfaces, such as application programming interfaces (APIs), text interfaces, graphical user interfaces (GUIs), or other interfaces.

In some embodiments, query service 112 is "serverless" from the user's perspective, meaning the hardware used to implement the service is primarily managed by the provider network and a user can use the service without awareness of the underlying hardware and other components used to run the queries and perform other actions. Users can access the query service via various interfaces such as, for example, a web-based console, an API provided by the query service, or a CLI interface. Using these interfaces, a user can perform various actions including creating or selecting databases; creating, viewing, and deleting tables representing the user's data; filtering tables; previewing tables; showing table properties; running queries on tables, saving and formatting queries, and viewing query history; displaying, saving, and exporting query results, and so forth. A query service as described herein enables users to query virtually any type of data and data format stored in a storage service 116.

The request may include a query, such as a structured query language (SQL), or other query language, statement. Although embodiments are described generally using SQL statements, this is for ease of illustration and not intended to be limiting. Embodiments may be similarly implemented using alternative query languages. The query service may include a query engine 110 which can process the query included in the request. In various embodiments, the query engine may be configured to execute portions of a query in a batch mode using a batch manager 114. In some embodiments, batch manager 114 may be associated with a particular remote service 118 or may be operable to generate a batch to be sent to one or more remote services provided by provider network 100. In some embodiments, the query service 112 can be configured to identify particular function calls in the query that are associated with processing to be performed by a remote service 118 and which may be processed in a batch.

The query engine may analyze the query received in the request at numeral 1A or 1B and generate a query plan for the query. The query plan may include a logical query plan and/or a physical query plan which represents the operations to be performed on the data and which can be executed by a query executor (such as a SQL executor or other database executor) or one or more worker nodes of the query service. For example, the query may include operations to be performed on data stored in storage service 116 and these operations may include calls to one or more remote services 118. The query plan that is generated may include obtaining data from the storage service at numeral 2. In some embodiments, one or more operations may be performed on the data (e.g., filtering the data, joining the data, etc.), and/or calling one or more remote services 118 to perform a function using the data. Because the remote service 118 is external to the query service 112, a network call is required to invoke the remote service to perform a function using the data. Such network calls can be expensive, particularly if the remote service is being invoked repeatedly for multiple data items obtained from storage service 116. As such, batch manager 114 can first generate a batch of service calls to be sent to remote service 118 and, once the batch is complete, send the batch of service calls at numeral 3.

A response from the remote service 118 having performed a function using the data may be received by the batch manager 114 at numeral 4 and the results can be cached locally at the query engine 110. As the query plan is executed, subsequent calls for the remote service can be served from the cache, if the results have already been obtained. This allows the traditional scalar model of one result at a time to be preserved during query processing, while amortizing the network call cost across the plurality of service calls included in the batch. If the result has not already been obtained, a new batch request can be sent to the remote service and the results cached again. Once query processing is complete, the results of the query can be returned to the client 104A or 104B, at numeral 5A or 5B, respectively.

In some embodiments, an optimal batch size used by the batch manager when generating a batch can be determined adaptively. Requiring the user to set the batch size can be burdensome and may result in a batch size that does not optimally use the available resources. Because the query engine is running many queries, the query engine is positioned to determine the optimal batch size for current conditions (e.g., based on the remote service being invoked, the hardware resources allocated to the query engine and/or remote service, the software stack in use, etc.). For example, the query service can vary the batch size on different queries it is running, in parallel or serially, and monitor the observed throughput. As batch size increases, throughput is expected to also increase. When throughput plateaus (e.g., fails to increase by at least a threshold amount), the batch size corresponding to the start of that plateau may be determined to be the optimal batch size. In some embodiments, the query engine may continuously or periodically monitor throughput and if throughput changes, may again vary batch size to determine an optimal batch size.

Figure 2:
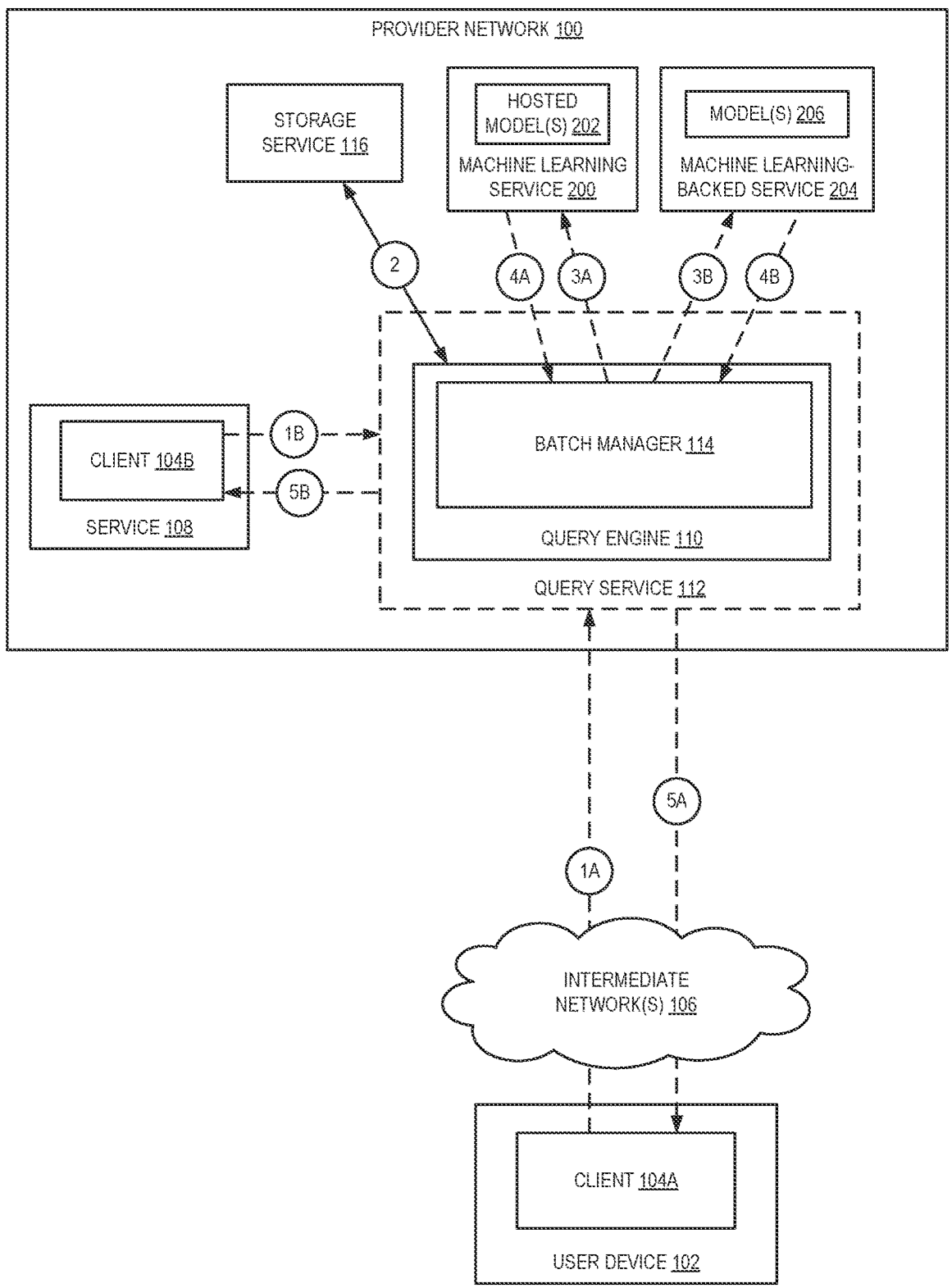
FIG. 2 is a diagram illustrating an environment for batch mode execution for calls to machine learning services according to some embodiments.

FIG. 2 is a diagram illustrating an environment for batch mode execution for calls to machine learning services according to some embodiments. As shown in FIG. 2, in some embodiments, the remote service(s) may include a machine learning service 200 and/or a machine learning-backed service 204. For example, a user may train custom models or provide their own models which are then hosted by a machine learning service 200 as hosted models 202. These hosted models may be used to perform inference tasks that are specific to the user, based on the user's own training data, or otherwise user-specific tasks. Machine learning-backed service 204 may include one or more pretrained models 206 that may be used to perform inference on user data. The models may be trained for various inference tasks that may be used by various users, such as sentiment analysis, text identification, object detection, etc.

The machine learning service and/or machine learning-backed service may analyze the user's data to obtain useful information for the user by performing inference on the data. For example, where the stored data includes image data, text data may be extracted from images or objects in the images may be identified, where the stored data include text data, the text data may be analyzed to identify sentiments associated with snippets of the text data, and/or other specialized models may be used to perform inference on the user's data to obtain information about the data. However, as discussed, use of machine learning techniques often requires specialized knowledge and is not well integrated into data management services, such as query service 112. Embodiments address these issues by providing techniques for making machine learning inference calls in database queries.

As shown in FIG. 2, a request can be sent to a query service 112 to perform a query on data stored in storage service 116. As discussed above, the request can originate from a user device 102, as shown at numeral 1A, or from a service 108 (e.g., a serverless function or other service) of provider network 100, as shown at numeral 1B. In various embodiments, a "serverless" function may include code provided by a user or other entity—such as the provider network itself—that can be executed on demand. The request may originate from a client 104A executing on user device 102, or a client 104B of service 108, which may interface with the database service 112 through one or more interfaces, such as application programming interfaces (APIs), text interfaces, graphical user interfaces (GUIs), or other interfaces.

The request may include a database query, such as a SQL (or other query language) statement. Although embodiments are described generally using SQL statements, this is for ease of illustration and not intended to be limiting. Embodiments may be similarly implemented using alternative query languages. The query engine 110 can process the query included in the request. In various embodiments, the query service can be updated to identify inference requests (e.g., service calls to a machine learning service to perform inference on data identified in the query) included in a query. In some embodiments, the query service 112 can be updated to be able to identify API calls for APIs published by machine learning-backed service 204 and/or user defined functions which call hosted model(s) 202 at endpoint(s) of machine learning service 200.

The batch manager 114 can generate a batch of machine learning service calls to be sent to the machine learning service at numeral 3A or the machine learning-backed service at numeral 3B. The batch may be generated up to a maximum batch size (e.g., include up to the maximum number of row). The maximum batch size may be defined by the machine learning function and may be based on a maximum batch size that can be processed by the machine learning service or machine learning-backed service, a maximum message size defined by the provider network, or other constraints. In some embodiments, the batch size may be specified in the machine learning function as a parameter, or if no batch size is specified, a default batch size may be used. Additionally, or alternatively, as discussed above, the batch size may be optimized adaptively by the query engine.

The machine learning service or machine learning-backed service can perform inference on the batch of machine learning service calls. At numeral 4A or 4B, an inference result is received from the machine learning service or machine learning-backed service, respectively. A first inference result may be used in query processing immediately and the remainder of the inference results may be stored locally in the query engine until query processing reaches the inference request associated with the cached inference responses. When query processing reaches a new inference request, the cache can be checked for the corresponding inference response. If found, the response can be returned. If not found, a new batch of machine learning service calls can be generated and sent off for inference processing, as discussed. As such, the cost of the network call required to invoke the machine learning service or machine learning backed service is spread over all of the service calls in the batch, allowing inference to be performed efficiently. Once query processing is complete, the results of the query can be returned to the client 104A or 104B, at numeral 5A or 5B, respectively.

Figure 3:
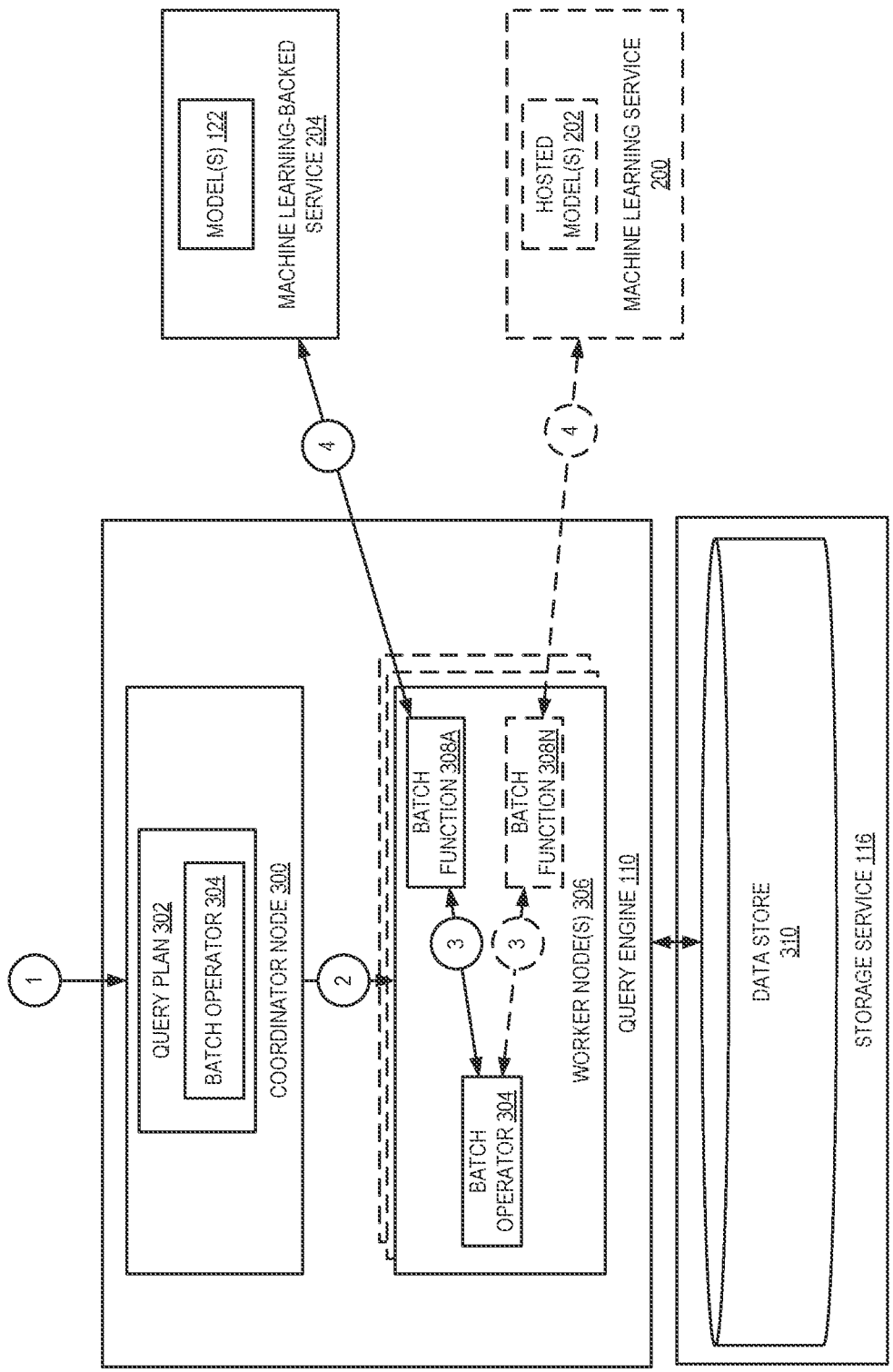
FIG. 3 is a diagram illustrating use of a batch mode operator for batch mode execution for calls to machine learning services according to some embodiments.

FIG. 3 is a diagram illustrating use of a batch mode operator for batch mode execution for calls to machine learning services according to some embodiments. In the embodiment shown in FIG. the batch manager may be implemented as one or more batch operators. In some embodiments, a query service is implemented using a distributed system running on a cluster of servers. As shown in FIG. 3, to execute queries and perform other operations, such a cluster can include a coordinator node 300 that manages the operation of any number worker nodes 306. At a high level, a query received from a client computing device may be initially received by a control plane and forwarded to a coordinator node 300. In some embodiments, the coordinator node 300 then parses the query, analyzes and plans the execution of the query, and distributes the work to carry out a query execution plan to one or more worker nodes 306.

In some embodiments, at numeral 1, coordinator node 300 of the query engine 110 receives a query. The coordinator node 300 analyzes the query and identifies the data sources involved (e.g., a storage location of a data store 310 in the storage service 116). In this example, the coordinator node 300 generates a query plan 302 that involves obtaining data from the data store 310 of storage service 116. The query may include various operations to be performed on the data, these operations may include calls to machine learning service 200 and/or machine learning-backed service 204. For example, a plurality of rows of data may be sent to machine learning service 200 and/or machine learning-backed service 204 to perform inference on the data before or after other operations (e.g., filters, joins, etc.) are performed on the data. To send these service calls in one or more batches, the query plan can include one or more batch operators 304. An operator may return pages of rows of a certain size but internally processes those pages one row at a time. Once finished building the results for a page, it returns the entire page. A batch operator may process the entire page at once by invoking a batch function that corresponds to the machine learning service, machine learning-backed service, or other service external to the query service.

In some embodiments, the coordinator node 300 can determine an appropriate amount of resources to be used to execute the query and launches a corresponding number of worker node(s) 306, at numeral 2. The launching of the worker node(s) 306 includes configuring the nodes to communicate with the data source(s) relevant to the query. As illustrated in the example of FIG. 3, in some embodiments, the configuration of the worker node(s) 306 occurs at query execution time. In this manner, the query service 112 can perform queries on newly added data sources "on the fly" and without the user having to reconfigure the operation of the query engines. In other embodiments, one or more worker instances may be preconfigured to communicate with certain types of data sources.

When the worker node(s) 306 executes the query plan, the batch operator 304 calls one or more batch functions 308A-308N with an entire page, at numeral 3, and expects an entire page in response. If only a single remote service is being invoked, then a single batch function may be called by the batch operator. If multiple remote services are being invoked, then multiple batch functions may be called. In some embodiments, the batch operator 304 may only be called on function calls included in the SELECT list of the query. Accordingly, to maximize the use of batch functionality, the query may be optimized when the query plan 302 is generated to move function references into the SELECT list from other parts of the query, while still complying with SQL semantics. In some embodiments, the batch operator receives a batch of rows (e.g., as a page, part of a page, or more than a page) and provides that batch of rows to the batch function corresponding to the remote service being invoked.

At numeral 4, the batch function sends the batch of rows to its corresponding remote service. In the embodiment shown in FIG. 3, batch function 308A may send a batch of rows to machine learning backed service 204 and model(s) 122 may perform inference on the batch of rows and generate an inference result for each row. The inference result may include a primary result (e.g., for sentiment analysis, provide a sentiment, etc.) and may include one or more secondary results, such as a confidence score, or other result. In some embodiments, when generating the batch of rows, predicates may be pulled up such that the rows that require inference are minimized. This enables only those rows that require inference to be sent to the machine learning service or machine learning backed service.

In some embodiments, the machine learning function reference itself can appear at multiple parts of the query for multiple reasons. For example, the machine learning function may be called on some columns to perform filtering and may also appear in the final output in the select clause. Additionally, in some embodiments, the machine learning function may be called to obtain a primary output of the machine learning model in one part of the query and may be called to obtain a secondary output in another party of the query. The machine learning results that are received from the model may be maintained in a cache, locally on the worker node or on the query engine, which allows for the machine learning results to be retrieved multiple times without making duplicate calls to the machine learning service or machine learning backed service. For example, once inference has been performed on a particular data item, any additional service calls to perform inference on that data item later found while processing the query can retrieve the results from the cache. Once query processing is complete, the results of the query can be returned to the client that submitted the query.

Figure 4:
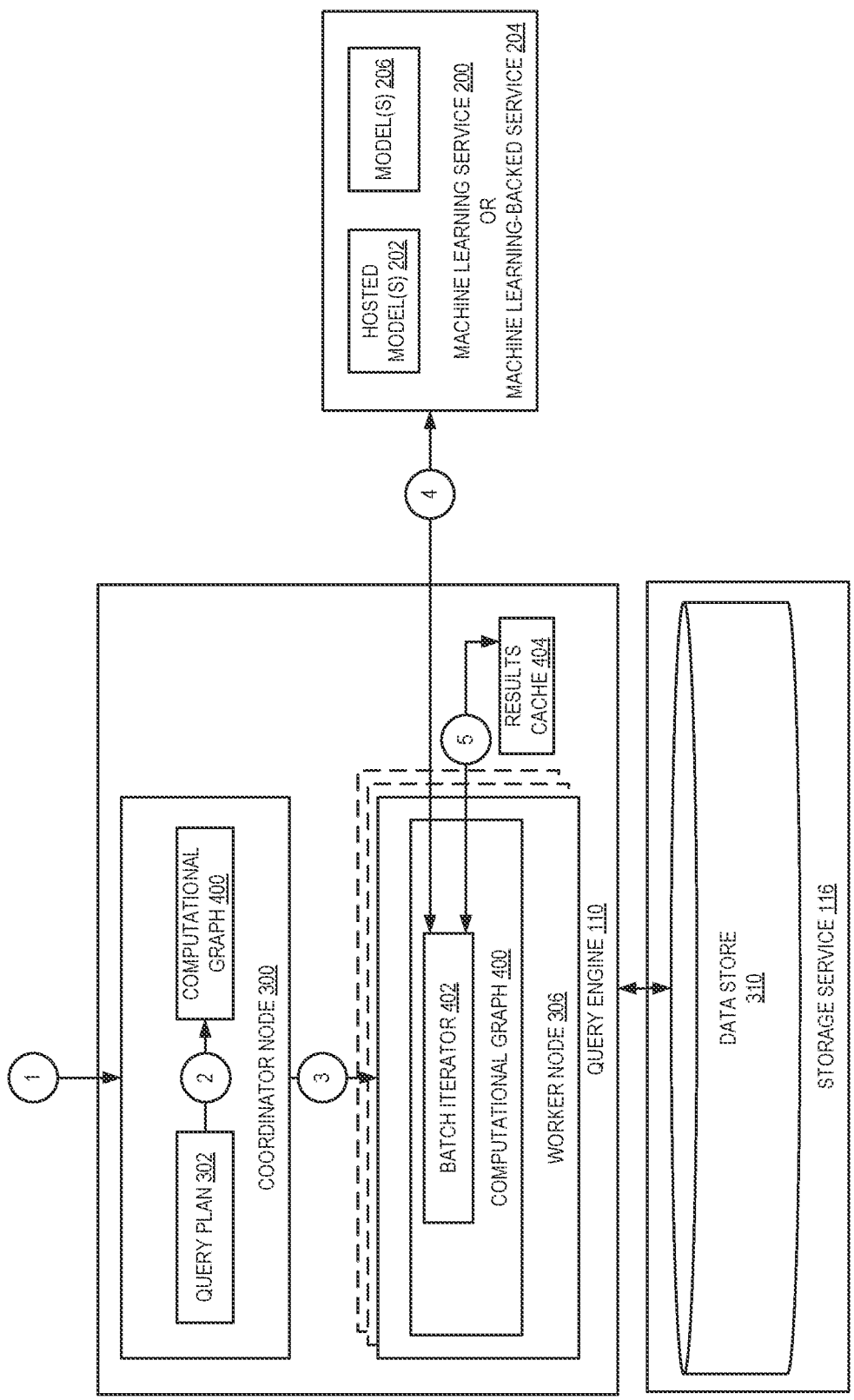
FIG. 4 is a diagram illustrating use of an iterator for batch mode execution for calls to machine learning services according to some embodiments.

FIG. 4 is a diagram illustrating use of a batch iterator for batch mode execution for calls to machine learning services according to some embodiments. In the embodiment of FIG. 4, the batch manager may be implemented as one or more batch iterators. As shown in FIG. 4, at numeral 1, coordinator node 300 of the query engine 110 receives a query. The coordinator node 300 analyzes the query and identifies the data sources involved (e.g., a storage location of a data store 310 in the storage service 116). In this example, the coordinator node 300 generates a query plan 302 that involves obtaining data from the data store 310 of storage service 116. The query may include various operations to be performed on the data, these operations may include calls to machine learning service 200 and/or machine learning-backed service 204. In some embodiments, all or portions of the query plan can be compiled into a computational graph 400. The computational graph may include one or more batch iterators which may be volcano model iterators that have been extended to provide batch functionality.

At numeral 2, the computational graph can be provided to one or more worker node(s) 306 that have been allocated to execute the query. Classic volcano model iterators operate on a pull model. If the iterator determines it needs to process a new tuple, the iterator requests it from its source(s) (e.g., using a next( ) function associated with each source), which request from their source(s), until the iterators reach the most primitive level which is disk. The classic volcano model iterators process data one row at a time (e.g., each time a new tuple is to be processed it is requested, once received it is processed, and then the next tuple can be requested and processed, and so on). The batch iterator 402 has been extended such that the first time the batch iterator is called in the execution of the query, instead of calling its sources once, it sends N next( ) requests to each of its sources to build a batch. The batch iterator can then process the batch of tuples it receives from its sources once. This processing may include making a call to machine learning service 200 or machine learning-backed service 204, at numeral 3. The inference results received from the machine learning service or machine learning-backed service can be stored in a results cache 404 on the worker node 306 or query engine 110, at numeral 4. When future tuple requests come are received by the batch iterator, it pulls the results from the results cache rather than making more network calls to the remote service. Once all of the results from the batch have been processed during query execution, if a new request comes in, then a new batch can be generated by again sending N more requests to batch iterator's sources to build a new batch, and so on. In some embodiments, the batch size, N, may be determined adaptively, as discussed above. Once query processing is complete, the results of the query can be returned to the client that submitted the query.

Figure 5:
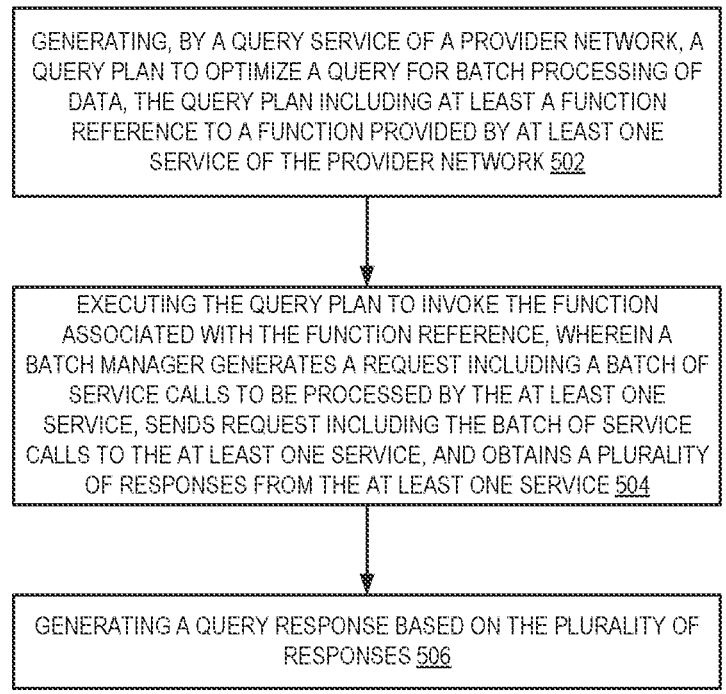
FIG. 5 is a flow diagram illustrating operations of a method for batch mode execution for calls to remote services according to some embodiments.

FIG. 5 is a flow diagram illustrating operations 500 of a method for batch mode execution for calls to remote services according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by query service 112, remote service 118, machine learning service 200, and/or machine learning-backed service 204 of the other figures.

The operations 500 include, at block 502, generating, by a query service of a provider network, a query plan to optimize a query for batch processing of data, the query plan including at least a function reference to a function provided by at least one service of the provider network.

The operations 500 further include, at block 504, executing the query plan to invoke the function associated with the function reference, wherein a batch manager generates a batch of service calls to be processed by the at least one service, sends the batch of service calls to the at least one service, and obtains a plurality of responses from the at least one service. In some embodiments, the batch is associated with a batch size determined by the query service based on observed throughput.

In some embodiments, the batch manager is a batch operator of the query plan. In some embodiments, executing the query plan to invoke the function associated with the function reference, wherein a batch manager generates a batch of service calls to be processed by the at least one service, sends the batch of service calls to the at least one service, and obtains a plurality of responses from the at least one service, further comprises launching at least one worker node to execute the query plan, the at least one worker node to call the batch operator of the query plan, the batch operator to generate the batch of service calls and provide the batch of service calls to a batch function associated with the at least one service which sends the batch of service calls to the at least one service and passes the plurality of responses to the batch operator, wherein the batch operator processes a first response from the plurality of responses and caches any remaining responses at the at least one worker node. In some embodiments, the operations may further include optimizing the query plan by migrating the function reference to a SELECT list of the query from any other portion of the query.

In some embodiments, the batch manager is a batch iterator generated based at least on portions of the query plan. In some embodiments, executing the query plan to invoke the function associated with the function reference, wherein a batch manager generates a request including a batch of service calls to be processed by the at least one service, sends the request including the batch of service calls to the at least one service, and obtains a plurality of responses from the at least one service, further comprises launching at least one worker node to execute the query plan, the at least one worker node to request a next tuple from the batch iterator, the batch iterator to send a plurality of next requests to one or more sources of the batch iterator, receive a plurality of next responses from the one or more sources, wherein the batch of service calls is based at least on the plurality of next responses, send the batch of service calls to the at least one service and receive the plurality of response from the at least one service, return a first response from the plurality of responses to the at least one worker node, and cache any remaining responses at the at least one worker node.

The operations 500 further include, at block 506, generating a query response based on the plurality of responses. In some embodiments, the at least one service is a machine learning service hosting a custom machine learning model or a machine learning-backed service having a machine learning model provided by the provider network, and wherein the plurality of responses are inference responses. In some embodiments, the machine learning service or the machine learning-backed service receives the plurality of service calls and performs inference using a machine learning model to generate the plurality of responses.

In some embodiments, the operations further include storing the plurality of responses in a cache, identifying, during execution of the query plan, a next service call associated with a data item associated with at least one of the plurality of responses stored in the cache, and retrieving the at least one of the plurality of responses from the cache. For example, once inference has already been performed on a data item, if another call to perform inference on that data item is found during query processing, the result can be retrieved from the cache rather than making another inference call.

In some embodiments, the operations include receiving, by a query service of a provider network, a query, the query including one or more operations to be performed by a machine learning service on data stored in a storage service of a provider network, generating, by the query service, a query plan to optimize the query for batch processing by moving one or more function references to the machine learning service in the query to a SELECT list of the query, executing the query plan by calling a batch operator to generate a batch of service calls to be processed by the machine learning service, provide the batch of service calls to the machine learning service, and receive a plurality of responses from the machine learning service, and generating a query response based on the plurality of responses.

In some embodiments, executing the query plan further causes the batch operator to call a batch function associated with the machine learning service, the batch function to provide data associated with the plurality of requests to the machine learning service. In some embodiments, the one or more function references are application programming interface or user defined function calls.

Figure 6:
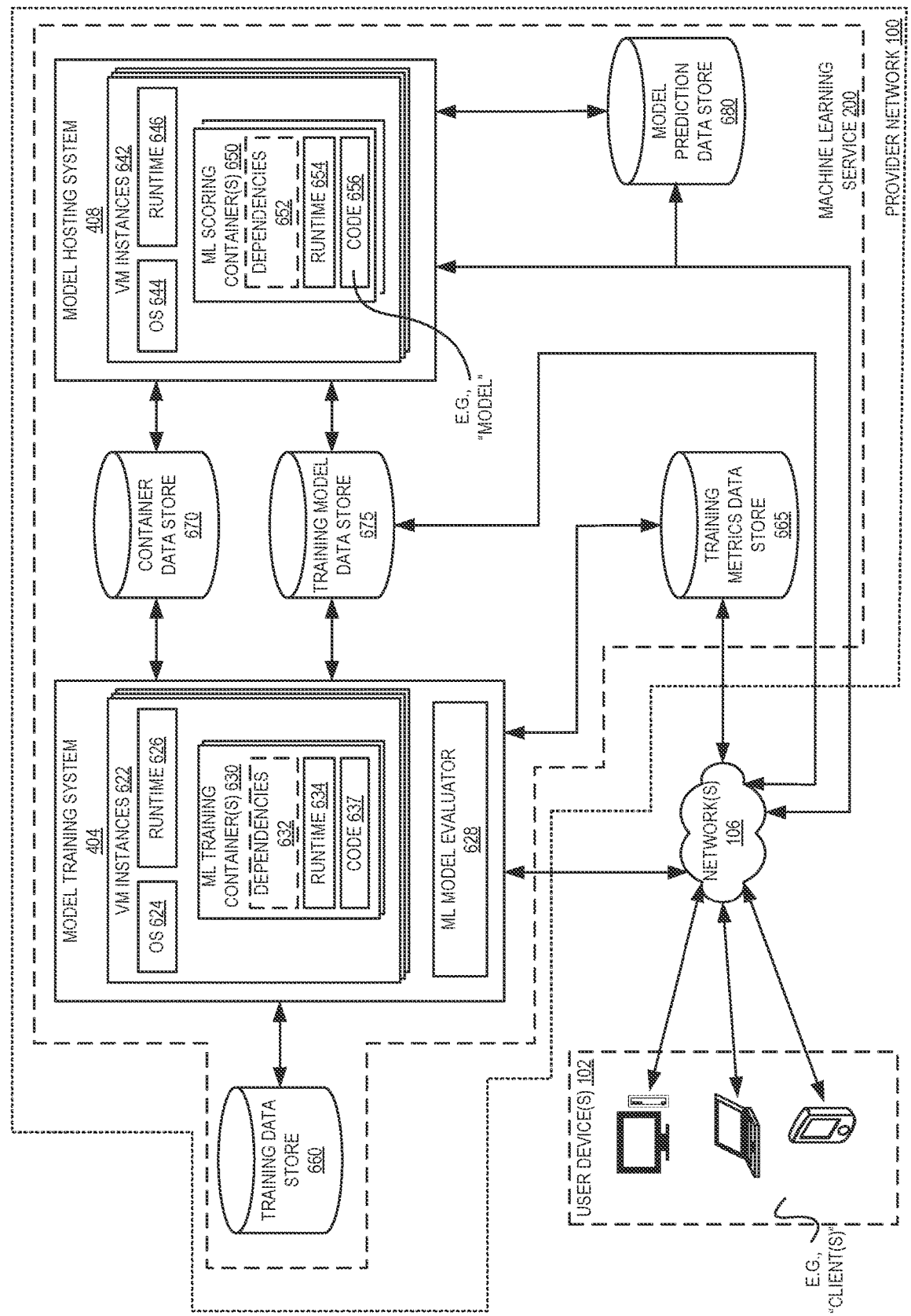
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 102, a model training system 404, a model hosting system 408, a training data store 660, a training metrics data store 665, a container data store 670, a training model data store 675, and a model prediction data store 680.

A machine learning service 200 described herein may include one or more of these entities, such as the model hosting system 408, model training system 408, and so forth.

In some embodiments, users, by way of user devices 102, interact with the model training system 408 to provide data that causes the model training system 408 to train one or more machine learning models, for example, as described elsewhere herein. A machine learning model, generally, may be thought of as one or more equations that are "trained" using a set of data. In some embodiments, the model training system 408 provides ML functionalities as a web service, and thus messaging between user devices 102 and the model training system 408 (or provider network 100), and/or between components of the model training system 408 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 102 can interact with the model training system 408 via frontend 629 of the model training system 408. For example, a user devices 102 can provide a training request to the frontend 629 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user devices 102, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user devices 102 may provide, in the training request, an algorithm written in any programming language. The model training system 408 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user devices 102, may develop an algorithm/code using an application (for example, an interactive web-based programming environment) and cause the algorithm/code to be provided—perhaps as part of a training request (or referenced in a training request)—to the model training system 408, where this algorithm/code may be containerized on its own or used together with an existing container having a machine learning framework, for example.

In some embodiments, instead of providing a container image in the training request, the user devices 102 provides, in the training request, an indicator of a container image (for example, an indication of an address or a location at which a container image is stored). For example, the container image can be stored in a container data store 670, and this container image may have been previously created/uploaded by the user. The model training system 408 can retrieve the container image from the indicated location and create a container using the retrieved container image. The container is then loaded into a virtual machine instance 622 for training a machine learning model, as described in greater detail below.

The model training system 408 can use the information provided by the user devices 102 to train a machine learning model in one or more pre-established virtual machine instances 622 in some embodiments. In particular, the model training system 408 includes a single physical computing device or multiple physical computing devices that are interconnected using one or more computing networks (not shown), where the physical computing device(s) host one or more virtual machine instances 622. The model training system 408 can handle the acquisition and configuration of compute capacity (for example, containers, instances, etc., which are described in greater detail below) based on the information describing the computing machine on which to train a machine learning model provided by the user devices 102. The model training system 408 can then train machine learning models using the compute capacity, as is described in greater detail below. The model training system 408 can automatically scale up and down based on the volume of training requests received from user devices 102 via frontend 629, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (for example, task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (for example, creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (for example, the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (for example, execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 408 uses one or more container images included in a training request (or a container image retrieved from the container data store 670 in response to a received training request) to create and initialize a ML training container 630 in a virtual machine instance 622. For example, the model training system 408 creates a ML training container 630 that includes the container image(s) and/or a top container layer.

Prior to beginning the training process, in some embodiments, the model training system 408 retrieves training data from the location indicated in the training request. For example, the location indicated in the training request can be a location in the training data store 660. Thus, the model training system 408 retrieves the training data from the indicated location in the training data store 660. In some embodiments, the model training system 408 does not retrieve the training data prior to beginning the training process. Rather, the model training system 408 streams the training data from the indicated location during the training process. For example, the model training system 408 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (for example, a buffer storing the retrieved portion is nearly empty), then the model training system 408 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (for example, coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 408 as input parameters to some or all of the instructions being executed.

In some embodiments, executing the executable instructions causes the virtual machine instance 622 (for example, the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 408 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user devices 102 can submit a deployment and/or execution request in a manner as described below to deploy and/or execute a version of a partially trained machine learning model (for example, a machine learning model trained as of a certain stage in the training process). A version of a partially trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 408 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (for example, information indicating that N ML training containers 630 are collectively training a machine learning model and that a particular ML training container 630 receiving the configuration information is ML training container 630 number X of N), which can be included in the resulting model data. By parallelizing the training process, the model training system 408 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 408 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 408 can further provide configuration information to each ML training container 630 via the virtual machine instances 622 (for example, information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 408 can significantly reduce the training time in some embodiments.

In some embodiments, the model training system 408 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 408 includes a ML model evaluator 628. The ML model evaluator 628 can monitor virtual machine instances 622 as machine learning models are being trained, obtaining the generated model data, and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (for example, known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user devices 102, can access and retrieve the model metrics from the training metrics data store 665. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user devices 102, can transmit a request to the model training system 408 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 408 can modify the machine learning model accordingly. For example, the model training system 408 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 408 can cause the virtual machine instance 622 to modify the execution of code stored in an existing ML training container 630 according to the data provided in the modification request. In some embodiments, the user, via the user devices 102, can transmit a request to the model training system 408 to stop the machine learning model training process. The model training system 408 can then instruct the virtual machine instance 622 to delete the ML training container 630 and/or to delete any model data stored in the training model data store 675.

As described below, in some embodiments, the model data stored in the training model data store 675 is used by the model hosting system 404 to deploy machine learning models. Alternatively, or additionally, a user device 102 or another computing device (not shown) can retrieve the model data from the training model data store 675 to implement a learning algorithm in an external device. As an illustrative example, a robotic device can include sensors to capture input data. A user device 102 can retrieve the model data from the training model data store 675 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (for example, rapid initialization of machine learning model training in ML training container(s) 630) in response to training requests.

In some embodiments, the model training system 102 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 102, the model hosting system 404, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 404 includes a single physical computing device or multiple physical computing devices that are interconnected using one or more computing networks (not shown), where the physical computing device(s) host one or more virtual machine instances 642. The model hosting system 404 can handle the acquisition and configuration of compute capacity (for example, containers, instances, etc.) based on demand for the execution of trained machine learning models. The model hosting system 404 can then execute machine learning models using the compute capacity, as is described in greater detail below. The model hosting system 404 can automatically scale up and down based on the volume of execution requests received from user devices 102 via frontend of the model hosting system 404, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (for example, task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (for example, creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (for example, supporting software such as libraries) needed by the code 656 in some embodiments. The runtime 654 can be defined by one or more executable instructions that form at least a portion of a container image that is used to form the ML scoring container 650 (for example, the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (for example, predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 404 uses one or more container images included in a deployment request (or a container image retrieved from the container data store 670 in response to a received deployment request) to create and initialize a ML scoring container 650 in a virtual machine instance 642. For example, the model hosting system 404 creates a ML scoring container 650 that includes the container image(s) and/or a top container layer.

As described above, a user device 102 can submit a deployment request and/or an execution request to the model hosting system 404 via the frontend in some embodiments. A deployment request causes the model hosting system 404 to deploy a trained machine learning model into a virtual machine instance 642. For example, the deployment request can include an identification of an endpoint (for example, an endpoint name, such as an HTTP endpoint name) and an identification of one or more trained machine learning models (for example, a location of one or more model data files stored in the training model data store 675). Optionally, the deployment request also includes an identification of one or more container images stored in the container data store 670.

Upon receiving the deployment request, the model hosting system 404 initializes ones or more ML scoring containers 650 in one or more hosted virtual machine instance 642. In embodiments in which the deployment request includes an identification of one or more container images, the model hosting system 404 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 404 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 404 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 404 retrieves the identified model data file from the training model data store 675 and inserts the model data file into a single ML scoring container 650, which forms a portion of code 656. In some embodiments, the model data file is archived or compressed (for example, formed from a package of individual files). Thus, the model hosting system 404 unarchives or decompresses the model data file to obtain multiple individual files and inserts the individual files into the ML scoring container 650. In some embodiments, the model hosting system 404 stores the model data file in the same location as the location in which the model data file was stored in the ML training container 630 that generated the model data file. For example, the model data file initially was stored in the top container layer of the ML training container 630 at a certain offset, and the model hosting system 404 then stores the model data file in the top container layer of the ML scoring container 650 at the same offset.

In embodiments in which multiple model data files are identified in the deployment request, the model hosting system 404 retrieves the identified model data files from the training model data store 675. The model hosting system 404 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 404 associates the initialized ML scoring container(s) 650 with the endpoint identified in the deployment request. For example, each of the initialized ML scoring container(s) 650 can be associated with a network address. The model hosting system 404 can map the network address(es) to the identified endpoint, and the model hosting system 404 or another system (for example, a routing system, not shown) can store the mapping. Thus, a user device 102 can refer to trained machine learning model(s) stored in the ML scoring container(s) 650 using the endpoint. This allows for the network address of an ML scoring container 650 to change without causing the user operating the user device 102 to change the way in which the user refers to a trained machine learning model.

Once the ML scoring container(s) 650 are initialized, the ML scoring container(s) 650 are ready to execute trained machine learning model(s). In some embodiments, the user device 102 transmits an execution request to the model hosting system 404 via the frontend, where the execution request identifies an endpoint and includes an input to a machine learning model (for example, a set of input data). The model hosting system 404 or another system (for example, a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 404 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively, or in addition, the virtual machine instance 642 transmits the output to the user device 102 that submitted the execution result via the frontend.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 102 via the frontend (for example, if no more trained machine learning models are needed to generate an output) or transmit the second output to a third ML scoring container 650 initialized in the same or different virtual machine instance 642 (for example, if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (for example, rapid initialization of ML scoring container(s) 650, rapid execution of code 656 in ML scoring container(s), etc.) in response to deployment and/or execution requests.

In some embodiments, the model hosting system 404 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 102, the model training system 408, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 408 and the model hosting system 404 depicted in FIG. 6 are not meant to be limiting. For example, the model training system 408 and/or the model hosting system 404 could also operate within a computing environment having a fewer or greater number of devices than are illustrated in FIG. 6. Thus, the depiction of the model training system 408 and/or the model hosting system 404 in FIG. 6 may be taken as illustrative and not limiting to the present disclosure. For example, the model training system 408 and/or the model hosting system 404 or various constituents thereof could implement various web services components, hosted or "cloud" computing environments, and/or peer-to-peer network configurations to implement at least a portion of the processes described herein. In some embodiments, the model training system 408 and/or the model hosting system 404 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 102 and provisions virtual machine instances 622. In some embodiments, the frontend 629 serves as a front door to all the other services provided by the model training system 408. The frontend 629 processes the requests and makes sure that the requests are properly authorized. For example, the frontend 629 may determine whether the user associated with the training request is authorized to initiate the training process.

Similarly, frontend processes all deployment and execution requests received from user devices 102 and provisions virtual machine instances 642. In some embodiments, the frontend serves as a front door to all the other services provided by the model hosting system 404. The frontend processes the requests and makes sure that the requests are properly authorized. For example, the frontend may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 408 and the model hosting system 404, this is not meant to be limiting. For example, in some embodiments not shown, the training data store 660 is located internal to at least one of the model training system 408 or the model hosting system 404.

In some embodiments, the training metrics data store 665 stores model metrics. While the training metrics data store 665 is depicted as being located external to the model training system 408 and the model hosting system 404, this is not meant to be limiting. For example, in some embodiments not shown, the training metrics data store 665 is located internal to at least one of the model training system 408 or the model hosting system 404.

The container data store 670 stores container images, such as container images used to form ML training containers 630 and/or ML scoring containers 650, that can be retrieved by various virtual machine instances 622 and/or 642. While the container data store 670 is depicted as being located external to the model training system 408 and the model hosting system 404, this is not meant to be limiting. For example, in some embodiments not shown, the container data store 670 is located internal to at least one of the model training system 408 and the model hosting system 404.

The training model data store 675 stores model data files. In some embodiments, some of the model data files are comprised of a single file, while other model data files are packages of multiple individual files. While the training model data store 675 is depicted as being located external to the model training system 408 and the model hosting system 404, this is not meant to be limiting. For example, in some embodiments not shown, the training model data store 675 is located internal to at least one of the model training system 408 or the model hosting system 404.

The model prediction data store 680 stores outputs (for example, execution results) generated by the ML scoring containers 650 in some embodiments. While the model prediction data store 680 is depicted as being located external to the model training system 408 and the model hosting system 404, this is not meant to be limiting. For example, in some embodiments not shown, the model prediction data store 680 is located internal to at least one of the model training system 408 and the model hosting system 404.

While the model training system 408, the model hosting system 404, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 102 via the one or more network(s) 106.

Various example user devices 102 are shown in FIG. 6, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 408 and/or the model hosting system 404 provides the user devices 102 with one or more user interfaces, command-line interfaces (CLI), application programming interfaces (API), and/or other programmatic interfaces for submitting training requests, deployment requests, and/or execution requests. In some embodiments, the user devices 102 can execute a stand-alone application that interacts with the model training system 408 and/or the model hosting system 404 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
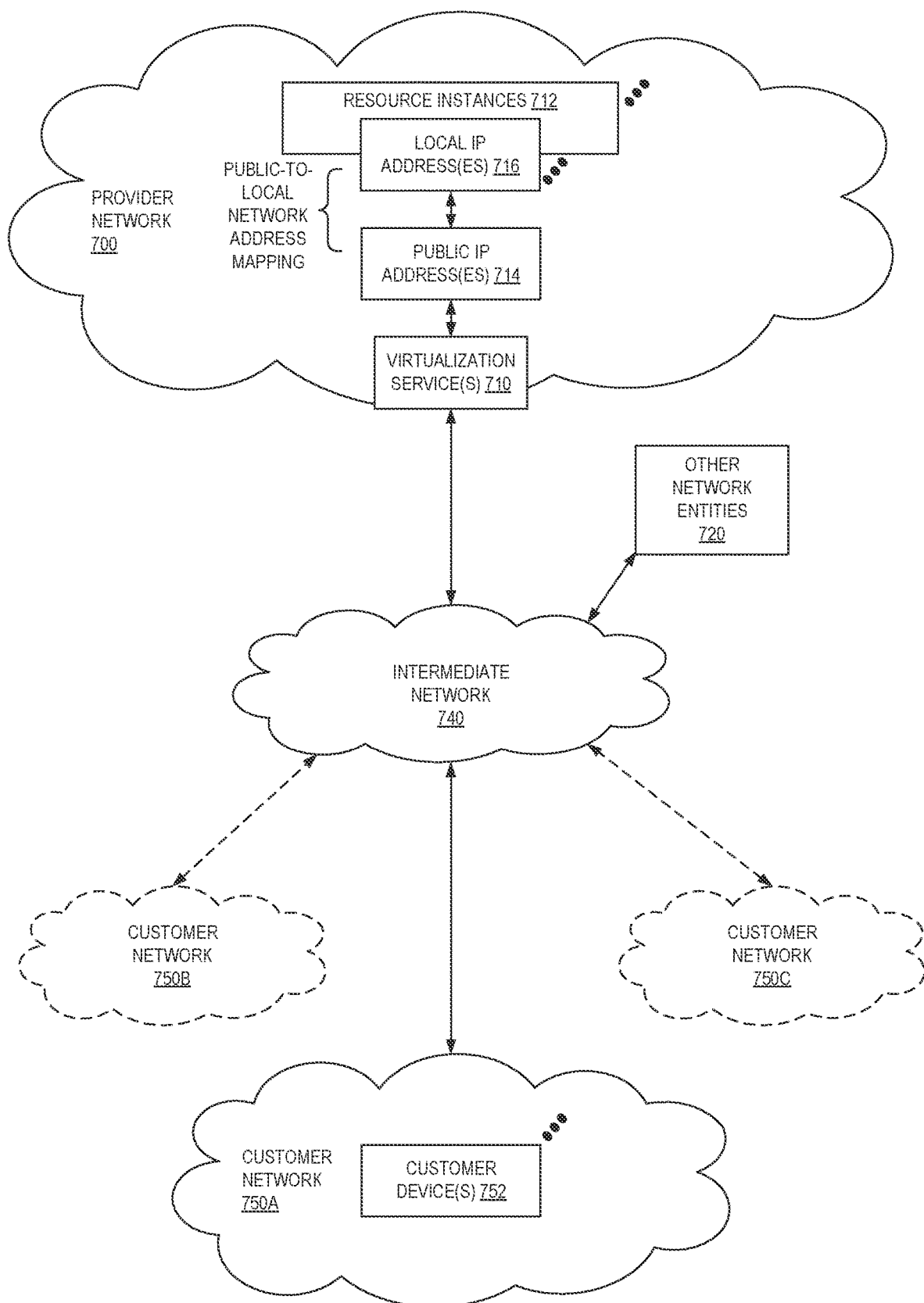
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
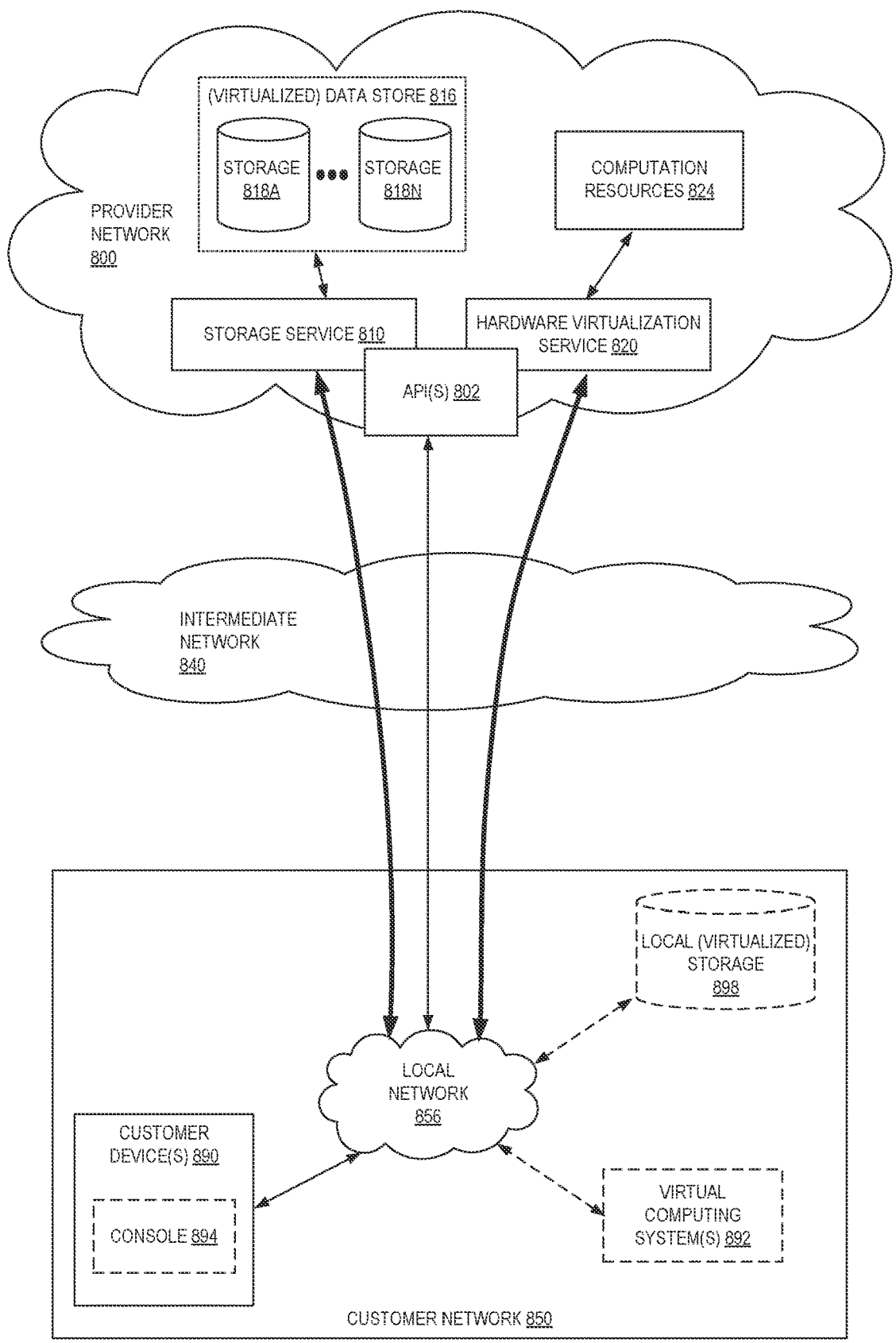
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
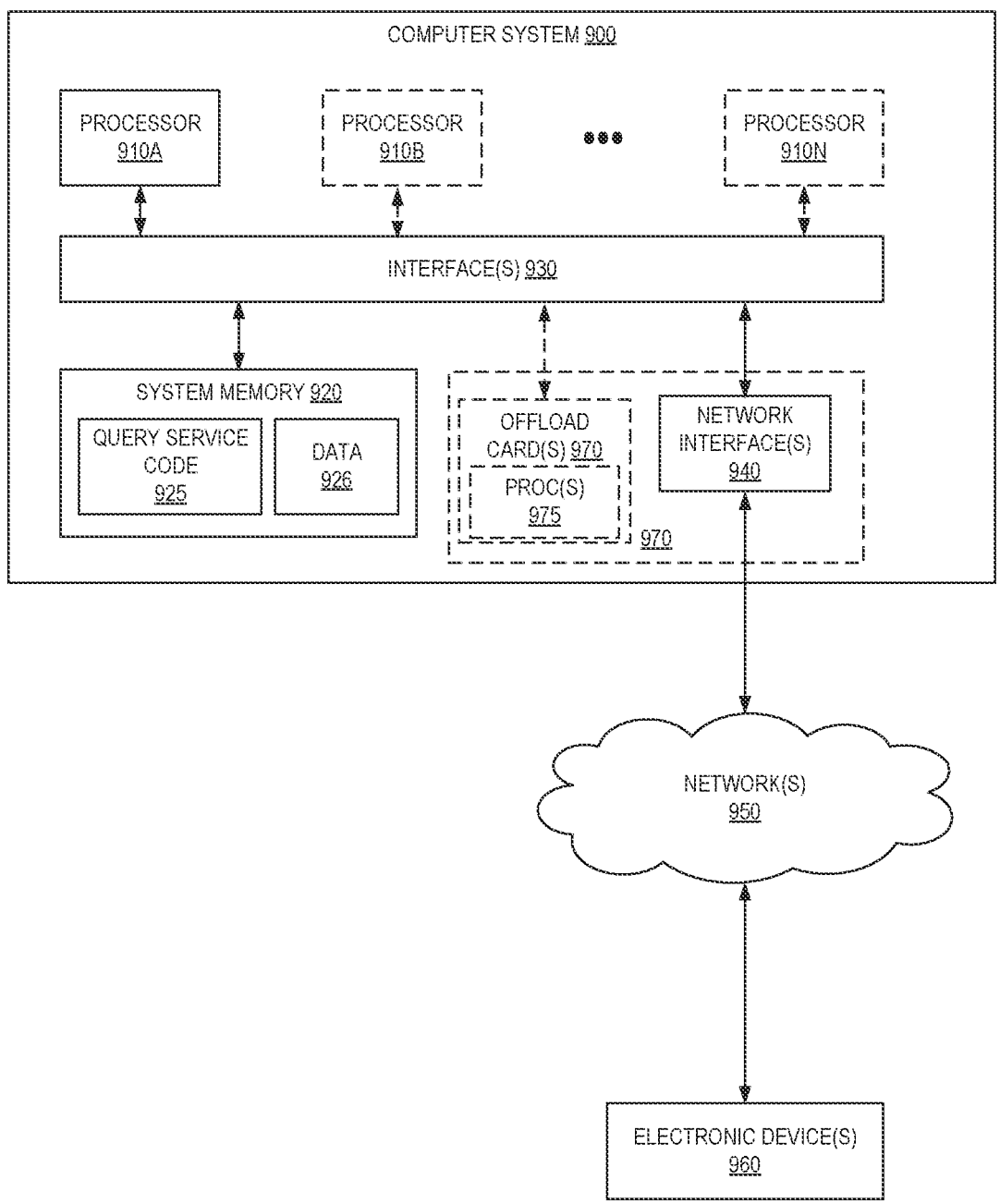
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as query service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a query service of a provider network, a query, the query including one or more operations to be performed by a machine learning service on data stored in a storage service of the provider network;
generating, by a query engine of the query service, a query plan to optimize the query for batch processing by moving one or more function references to the machine learning service in the query to a SELECT list of the query;
executing, by a batch manager of the query engine, the query plan by:
calling a batch operator of the query plan, causing the batch operator to call a batch function associated with the machine learning service;
gathering, by the batch operator, multiple data rows;
generating, by the batch operator, a batch of service calls including the multiple data rows to be processed by the machine learning service;
providing, by the batch function, the batch of service calls including the multiple data rows to the machine learning service in a single request; and
receiving, by the batch function, a plurality of responses from the machine learning service; and
generating a query response based on the plurality of responses.

2. The computer-implemented method of claim 1, wherein the batch of service calls is associated with a batch size determined by the query service based on observed throughput of the query engine.

3. The computer-implemented method of claim 1, wherein the one or more function references are application programming interface calls or user-defined function calls.

4. A computer-implemented method comprising:
generating, by a query service of a provider network, a query plan to optimize a query for batch processing of data, the query plan including at least a function reference to a batch function provided by at least one service of the provider network;
executing, by a batch manager of the query service, the query plan by:
calling a batch operator of the query plan, causing the batch operator to call the batch function;
gathering, by the batch operator, multiple data rows;
generating, by the batch operator, a request including a batch of service calls, the batch of service calls including the multiple data rows to be processed by the at least one service;
sending, by the batch function, the request, including the batch of service calls, to the at least one service; and
obtaining, by the batch function, a plurality of responses from the at least one service; and
generating a query response based on the plurality of responses.

5. The computer-implemented method of claim 4, wherein executing, by the batch manager of the query service, the query plan further comprises:
launching at least one worker node that executes the query plan and calls the batch operator of the query plan, wherein the batch operator:
processes a first response from the plurality of responses; and
caches any remaining responses from the plurality of responses at the at least one worker node.

6. The computer-implemented method of claim 5, further comprising:
optimizing the query plan by migrating the function reference to a SELECT list of the query from any other portion of the query.

7. The computer-implemented method of claim 4, wherein the batch manager is implemented using a batch iterator generated based at least on portions of the query plan.

8. The computer-implemented method of claim 7, wherein executing, by the batch manager of the query service, the query plan further comprises:
launching at least one worker node that executes the query plan and requests a next tuple from the batch iterator, wherein the batch iterator:
sends a plurality of next requests to one or more sources of the batch iterator;
receives a plurality of next responses from the one or more sources, wherein the batch of service calls is based at least on the plurality of next responses;
returns a first response from the plurality of responses to the at least one worker node; and
caches any remaining responses from the plurality of responses at the at least one worker node.

9. The computer-implemented method of claim 4, wherein the at least one service is a machine learning service hosting a custom machine learning model, a machine learning-backed service having a machine learning model provided by the provider network, or a machine learning-backed service hosting the custom machine learning model.

10. The computer-implemented method of claim 9, wherein the machine learning service or the machine learning-backed service receives the request including the batch of service calls and performs inference using a machine learning model to generate the plurality of responses.

11. The computer-implemented method of claim 9, wherein the batch of service calls is associated with a batch size determined by the query service based on observed throughput of a query engine of the query service.

12. The computer-implemented method of claim 4, further comprising:
storing the plurality of responses in a cache;
identifying, during execution of the query plan, a next service call associated with a data item associated with at least one of the plurality of responses stored in the cache; and
retrieving the at least one of the plurality of responses from the cache.

13. A system comprising:
a first one or more electronic devices implementing a machine learning service in a multi-tenant provider network; and
a second one or more electronic devices implementing a query service in the multi-tenant provider network, the query service including instructions that upon execution by one or more processors cause the query service to:
generate a query plan to optimize a query for batch processing of data, the query plan including at least a function reference to a batch function provided by the machine learning service;
execute, by a batch manager of the query service, the query plan by:
calling a batch operator of the query plan, causing the batch operator to call the batch function;
gathering, by the batch operator, multiple data rows;
generating a request including a batch of service calls, the batch of service calls including the multiple data rows to be processed by the machine learning service;
sending, by the batch function, the request, including the batch of service calls, to the machine learning service; and
obtaining, by the batch function, a plurality of responses from the machine learning service; and
generate a query response based on the plurality of responses.

14. The system of claim 13, wherein to execute the query plan the instructions comprise further instructions that, when executed by the one or more processors, further cause the query service to:
launch at least one worker node that executes the query plan and calls the batch operator of the query plan, wherein the batch operator:
processes a first response from the plurality of responses; and
caches any remaining responses from the plurality of responses at the at least one worker node.

15. The system of claim 14, wherein the instructions comprise further instructions that, when executed by the one or more processors, further cause the query service to:
optimize the query plan by migrating the function reference to a SELECT list of the query from any other portion of the query.

16. The system of claim 13, wherein the batch manager is implemented using a batch iterator generated based at least on portions of the query plan, and wherein to execute the query plan the instructions comprise further instructions that, when executed by the one or more processors, further cause the query service to:
- launch at least one worker node that executes the query plan and requests a next tuple from the batch iterator, wherein the batch iterator:
  - sends a plurality of next requests to one or more sources of the batch iterator;
  - receives a plurality of next responses from the one or more sources, wherein the batch of service calls is based at least on the plurality of next responses;
  - returns a first response from the plurality of responses to the at least one worker node; and
  - caches any remaining responses from the plurality of responses at the at least one worker node.

17. The system of claim 13, wherein the machine learning service receives the request including the batch of service calls and performs inference using a machine learning model associated with the machine learning service to generate the plurality of responses.

18. The system of claim 13, wherein the batch of service calls is associated with a batch size determined by the query service based on observed throughput of a query engine of the query service.

19. The system of claim 13, wherein the machine learning service hosts a custom machine learning model.

20. The system of claim 13, wherein the instructions comprise further instructions that, when executed by the one or more processors, further cause the query service to:
- store the plurality of responses in a cache;
- identify, during execution of the query plan, a next service call associated with a data item associated with at least one of the plurality of responses stored in the cache; and
- retrieve the at least one of the plurality of responses from the cache.

* * * * *